J. O. Rourke,
Hay Fork.
No. 76,511.                              Patented April. 7, 1868
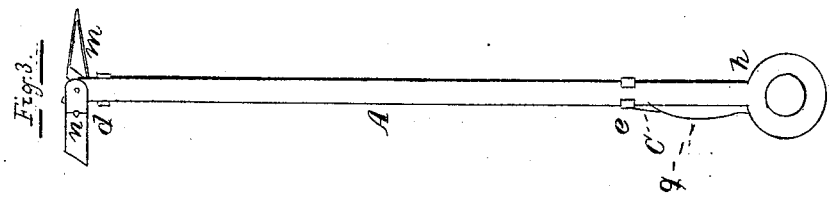
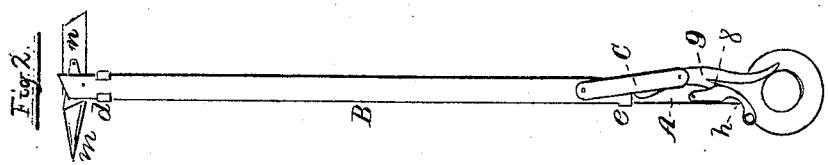
Witnesses                               Inventor
Jno. A. Ellis                           J. O. Rourke
J. W. Master                            per
                                        J. H. Alexander
                                        Atty
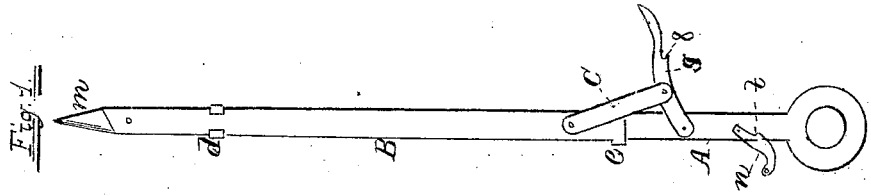

United States Patent Office.

JAMES O'ROURKE, OF COLUMBIANA, OHIO.

Letters Patent No. 76,511, dated April 7, 1868.

IMPROVEMENT IN HORSE HAY-FORKS.

*The Schedule referred to in these Letters Patent and making part of the same.*

TO ALL WHOM IT MAY CONCERN:

Be it known that I, JAMES O'ROURKE, of Columbiana, in the county of Columbiana, and State of Ohio, have invented certain new and useful Improvements in Hay-Forks; and I do hereby declare that the following is a full, clear, and exact description thereof, reference being had to the accompanying drawings, and to the letters of reference marked thereon, which form a part of this specification, in which—

Figure 1 represents a plan view, showing the fork in position to be charged.

Figure 2, a plan showing the same in position when loaded; and

Figure 3, a plan of the shaft reversed.

To enable those skilled in the art to make and use my invention, I will now describe its construction and operation.

A represents the shaft, furnished at one end with a hole, by means of which the rope is attached to the fork for operating it. B designates a sliding-bar, confined at its upper end to shaft A by the sliding sheath $e$, the said sheath being firmly secured to the bar B. $d$ represents a second sheath, which is secured to shaft A. By means of the sheaths $e$ and $d$, the bar B can be made to slide on shaft A as far as required to accomplish its ends. C represents a supplemental bar, pivoted at one end to bar B, and at the other end to handle $g$, the said handle being pivoted to shaft A. By means of handle $g$ the bar B is operated. $h$ represents a lever, having its fulcrum in shaft A. The said lever is provided with the spur $t$, which is designed to catch in the opening $s$, and by its action hold the bar B in position when required. $m$ represents a metal prong, flat at the upper end, and made sharp at the lower end for penetrating the hay. On the flat part of $m$, a shoulder is formed, against which the lower end of bar B is designed to rest. The prong $m$ is pivoted to bar B, so that when said bar is raised by means of handle $g$, the end of said bar will act on the shoulder of the prong $m$, and move it around to a horizontal position, or until its shoulder presses against the edge of bar B. $n$ represents a metal plate, pivoted at one end to shaft A, and at its centre to prong $m$. The position of plate $n$ will be governed by the motion of prong $m$, and when moved in a horizontal position, $n$ will be in a line with it, and thus present a lengthened resisting-surface, so as to prevent the hay from falling off.

The operation of my invention is as follows: The handle $g$, being pressed downwards until the upper end of it lies flat on the shaft A, the bar B and supplemental bar C will be in a line, and the prong $m$ and plate $n$ will, as already described, be brought in a line with shaft A. The shaft will now be allowed to descend upon the hay-cock, which will be penetrated to the required depth by prong $m$. The handle $g$ must now be raised, and by its action elevate bar B, prong $m$, and plate $n$ to a horizontal position, and all hay caught by said prong and plate can now be drawn up by means of the cord attached to shaft A. The hay will be discharged by lowering the handle again to its first position.

What I claim as new, and desire to secure by Letters Patent, is—

Handle $g$, lever $h$, and bar C, combined and operated as and for the purpose specified.

In testimony that I claim the foregoing as my own, I affix my signature in presence of two witnesses.

JAMES O'ROURKE.

Witnesses:
 GEORGE DUNCAN,
 THOS. C. ALLEN.